S. Jaqua.
Rolling Tires for Locomotive Wheels.

N° 37,206. Patented Dec. 16, 1862.

Witnesses
Isaac H. How
Wm. P. White

Inventor
Sherman Jaqua
By Thos. S. Crew
Atty

UNITED STATES PATENT OFFICE.

SHERMAN JAQUA, OF PATERSON, NEW JERSEY.

IMPROVEMENT IN MACHINES FOR ROLLING TIRES FOR LOCOMOTIVE-WHEELS.

Specification forming part of Letters Patent No. 37,206, dated December 16, 1862.

*To all whom it may concern:*

Be it known that I, SHERMAN JAQUA, of Paterson, in the county of Passaic and State of New Jersey, have invented certain Improvements in Machines for Rolling Tires for Locomotive Car-Wheels, the construction and operation of which I have described in the following specification and illustrated in its accompanying drawings with sufficient clearness to enable competent and skillful workmen in the arts to which it pertains or is most nearly allied to make and use my invention.

My said invention consists in, first, the arrangement, in an adjustable frame, as hereinafter described, of the top and bottom rollers for rolling the edges of the tires, said frame being adjustable in such a manner as to allow the axes of said rollers to be set in a radial line to the center of the different sizes of tires, and also capable of a radial adjustment in that line by which it can be made to bear properly upon the work; second, in the arrangement of parts hereinafter described for supporting the tire against the pressure of the top roller by two smaller rollers placed below it, by which the natural effect of the weight of the tire to cause it to bend downward as the pressure of the top roller acts upon it is obviated, and a finishing-roller for smoothing the flange of the tire is allowed to be introduced directly under the top roller, as hereinafter more fully set forth; third, the arrangement of the bottom rollers, which support and smooth the lower edge of the tire, out of the same radial plane in which the driving-rollers are located, by which the bottom rollers and the driving-rollers are prevented from intering with each other, and their more satisfactory construction made admissible, as hereinafter more fully set forth.

Figure 1:
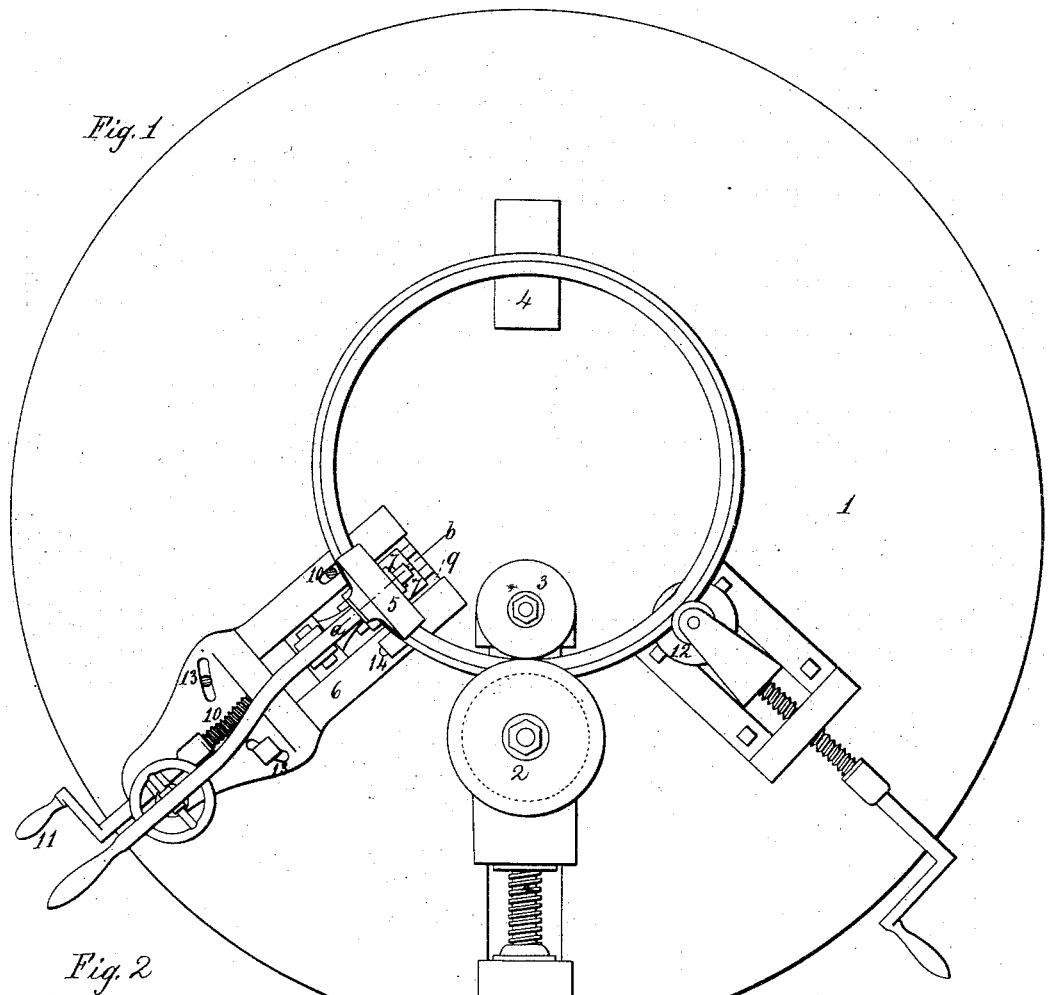
Figure 2:
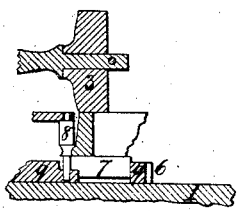

In the accompanying drawings, Figure 1 is a plan complete of my improved machine. Fig. 2 is a sectional elevation of some of the parts in detail as they would appear beyond the plane indicated by the line *a b*, as drawn upon Fig. 1.

1 is the bed of the machine, or, in other words, the table upon which the operating parts are mounted.

2 is the outer driving-roller, 3 the inner one, between which two rollers the sides of the tire are formed. The outer roller, 2, is constructed with flanges to pass above and below the tire, and overhang and support it, as indicated in Fig. 1 by the positions of the parts, the dotted line in the wheel 2 indicating the working-periphery of this roller, or, in other words, the diameter of the portion which bears against the periphery of the tire. The arrangement of the top and bottom rollers in a different plane allows this construction of the roller 2 to be adopted. This roller is made adjustable, by means of the screw 4, to roll tires of different thicknesses.

5 is the top roller. This is constructed and arranged very much in the manner described in the patent granted to me the 29th day of January, 1861, and the description there given need not be repeated here. There is, however, this difference, that in my present machine this roller is so hung in the frame 6 as to be capable of an adjustment to correspond with a radial line drawn from the center of the circle formed by the tire when rolled to its proper size, the adjustment being sufficient to accommodate it to the whole range of the different sizes of tires used for locomotive-wheels. The lower rollers, which support the under edge of the tire and assist in its formation, are also hung in the same frame and are adjusted by the same operation which adjusts the top roller.

In Fig. 1 the heads of two of the bolts which hold the frame 6 to the bed are not represented, the bolts being shown in section to allow an undisturbed view of the slots 13 and 14, which allow the adjustment of the frame. The slots 13 are nearly at right angles to the slots 14, so as to give stability to the parts when in adjustment. The advantage of this arrangement is obvious. These rollers are thus made to work in a direct line with the tire, instead of working diagonally upon it, and thereby drawing out of shape, as well as throwing more labor and strain upon the parts.

7 7 are the bottom rollers, which support the under edge of the tire. These rollers are small, as represented in the drawings, to bring their centers nearly under the axis of the roller 5, and to admit between them the axis of the small flange-roller 8, and thus constructed and arranged they serve to correct the tendency of the tire to sag away from the top roller at the moment of working. The flange-roller 8 has a groove in its lower end to fit upon and finish the flange of the tire, and this roller, and also the rollers 7 7, is hung in an adjustable slide, 9, which is operated by the set-screw 10. The fulcrum of the top roller, 5, is also attached to the same slide.

The arrangement of the rollers 7 7 and 8 in a different radial plane from that occupied by the rollers 2 and 3 allows them to be arranged also in the manner I have described, by which they are made more efficient, and also prevents their interfering with the said side rollers. The adjusting-screw 10 is operated by a crank, 11. 12 is a side roller to aid in keeping the tire in the proper form. It is adjustable to operate upon tires of different diameters. The tire is supported opposite the rollers 2 and 3 by the stationary bearing 4.

Having thus fully described my invention, it may be proper to say that I do not claim the employment of a bottom roller to support and finish the lower edge of the tire, as I have recently ascertained that this improvement has already been described in the Patent No. 8,698, granted by the French Government, under date of November 4, 1852, to a Mr. Bertsch, for a machine designed for the construction of tires for car-wheels.

I claim—

1. The arrangement, as described, of the top and bottom rollers in an adjustable frame, which is so constructed and attached to the bed as to allow the axes of the said rollers to be brought into a radial line with tires of various sizes, while at the same time they are made capable of inward and outward radial adjustment, substantially as set forth.

2. The arrangement of two bottom rollers, as herein described, in relation to the top roller, by which the tire is prevented from sagging away from the top roller, and a finishing flange-roller allowed to be placed immediately under the top roller, as herein set forth.

3. The arrangement of the bottom rollers, for finishing the lower edge of the tire, in a different radial plane from that which is occupied by the driving-rollers, by which they are prevented from interfering with the said driving-rollers, and a more efficient and satisfactory arrangement of parts is made admissible.

S. JAQUA.

Witnesses:
L. A. ROBERTS,
THOS. P. HOW.